US012112349B2

(12) United States Patent
Modani et al.

(10) Patent No.: US 12,112,349 B2
(45) Date of Patent: Oct. 8, 2024

(54) PROVIDING PERSONALIZED ALERTS AND ANOMALY SUMMARIZATION

(71) Applicant: ADOBE INC., San Jose, CA (US)

(72) Inventors: Natwar Modani, Bengaluru (IN); Iftikhar Ahamath Burhanuddin, Bangalore (IN); Gaurush Hiranandani, Bengaluru (IN); Shiv Kumar Saini, Bangalore (IN)

(73) Assignee: Adobe Inc., San Jose, CA (US)

( * ) Notice: Subject to any disclaimer, the term of this patent is extended or adjusted under 35 U.S.C. 154(b) by 1595 days.

(21) Appl. No.: 15/238,208

(22) Filed: Aug. 16, 2016

(65) Prior Publication Data

US 2018/0053207 A1 Feb. 22, 2018

(51) Int. Cl.
*G06Q 30/0242* (2023.01)

(52) U.S. Cl.
CPC ................. *G06Q 30/0244* (2013.01)

(58) Field of Classification Search
None
See application file for complete search history.

(56) References Cited

U.S. PATENT DOCUMENTS

| | | | | |
|---|---|---|---|---|
| 10,346,470 B1 * | 7/2019 | Casillas | ................. | G06F 16/68 |
| 2011/0010243 A1 * | 1/2011 | Wilburn | ............. | G06Q 30/0255 |
| | | | | 705/14.53 |
| 2014/0108640 A1 * | 4/2014 | Mathis | ................... | G06Q 30/02 |
| | | | | 709/224 |
| 2014/0316946 A1 * | 10/2014 | Sanders | ............. | G06Q 30/0633 |
| | | | | 705/26.62 |
| 2016/0103838 A1 * | 4/2016 | Sainani | .................. | G06Q 30/02 |
| | | | | 707/725 |
| 2017/0032252 A1 * | 2/2017 | Feminella | .............. | G06Q 30/02 |
| 2017/0329660 A1 * | 11/2017 | Salunke | ................. | G06Q 30/02 |

* cited by examiner

*Primary Examiner* — Michael J Sittner

(74) *Attorney, Agent, or Firm* — Shook, Hardy & Bacon L.L.P.

(57) ABSTRACT

Methods and systems are provided herein for summarizing a set of anomalies corresponding to a group of metrics of interest to a monitoring system user. Initially, a set of anomalies corresponding to a group of metrics is identified as having values that are outside of a predetermined range. A correlation value is determined for at least a portion of pairs of anomalies in the set of anomalies. For each anomaly in the set of anomalies, an informativeness value is computed that indicates how informative each anomaly in the set of anomalies is to the monitoring system user. The correlation values and the informativeness values are then used to identify at least one key anomaly and a plurality of non-key anomalies from the set of anomalies. A summary is generated of the identified at least one key anomaly to provide information to the monitoring system user about the set of anomalies for a particular time period.

16 Claims, 9 Drawing Sheets

500

| Metric Name | Severity | Interest | Confidence | Reward | Next Reward |
|---|---|---|---|---|---|
| a1 | 1.5 | 0.4 | 1.0 | 0.6 | 0 |
| a2 | 2.0 | 0.3 | 1.0 | 0.6 | 0.36 |
| a3 | 2.5 | 0.4 | 1.0 | 1.0 | 0.8 |
| a4 | 3.0 | 0.6 | 1.0 | 1.8 | 0.54 |
| a5 | 1.0 | 0.5 | 1.0 | 0.5 | 0.35 |
| a6 | 2.0 | 0.4 | 1.0 | 0.8 | 0.8 |
| a7 | 2.0 | 0.3 | 1.0 | 0.6 | 0.6 |

| Metric Name | Gain computation in 1 iteration | Gain value in 1st iteration | Gain value in 2nd iteration |
|---|---|---|---|
| a1 | 0.6+0.4*0.6+0.2*1.0 +0.7*1.8+0.3*0.5 | 2.45 | - |
| a2 | 0.4*0.6+0.6 | 0.84 | 0.36 |
| a3 | 0.2*0.6+1.0+0.5*0.8 +0.6*0.6 | 1.88 | 1.56 |
| a4 | 0.7*0.6+1.8 | 2.22 | 0.54 |
| a5 | 0.3*0.6+0.5 | 0.68 | 0.35 |
| a6 | 0.5*1.0+0.8 | 1.3 | 1.2 |
| a7 | 0.6*1.0+0.6 | 1.2 | 1.08 |

FIG. 6

PROVIDING PERSONALIZED ALERTS AND ANOMALY SUMMARIZATION

BACKGROUND

Metrics, or specific types of monitored data, can be useful to a monitoring system user (e.g., marketer, analyst, system administrator, etc.) who is responsible for monitoring a website, application, service, etc., so that the monitoring system user can perform mid-course corrections to marketing campaigns in progress or fine tune a mobile application or website being tracked. Exemplary metrics include number of web page views, revenue generation, time spent by visitors on web page, and the like. The number of metrics monitored in a typical monitoring system can be in the thousands or hundreds of thousands, and therefore it is unlikely that any single monitoring system user is interested in all tracked metrics. Instead, depending on the monitoring system user's objective, just a portion of these metrics may be of interest to the user.

Because of the large quantity of metrics being tracked, the monitoring system user may become overwhelmed with data if all data changes of all tracked metrics are provided to the user, as the user may only be interested in certain data, not all of it. Traditionally, monitoring system users have been able to set up manual alerts based on metrics of interest, but this process is time intensive and places a large burden on the monitoring system users to determine which metrics are of interest, considering the monitoring system users having thousands or tens of thousands of metrics from which to select. This may even prove to be a hindrance to the monitoring system user, who likely will not take the time to sift through tens of thousands of metrics to set up alerts.

SUMMARY

Embodiments of the disclosed technology are directed to determining which metrics are of interest to various monitoring system users. Because there could be thousands or more metrics, a monitoring system user would be overwhelmed by receiving data on thousands of metrics. As such, various aspects of the disclosed technology provide a determination of which metrics each user is particularly interested in. This may be done, for instance, by assigning a score to the metrics, which denotes the importance of a metric for a particular monitoring system user, which assists to determine whether that user needs to be alerted about any of the metrics, such as if there is an anomaly for that metric. To assign a score, the relevance and confidence of the metric is determined from the monitoring system user's report usage pattern and manual alerts that have been set up, along with collecting feedback, which may be based on email opened by the user and upvotes and downvotes provided by the user on alert emails.

Further, aspects of the disclosed technology facilitate the selection of key anomalies and related anomalies amongst a set of anomalies, where each anomaly has a corresponding metric that has been found to be of interest to a monitoring system user. Each key anomaly identified is able to provide information to the user regarding not only that key anomaly, but also related anomalies so that the user can be informed in a succinct manner regarding data changes in all of the anomalies. The various aspects also provide for different methods to determine how many key anomalies to select from a set of anomalies.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

The disclosed technology is described in detail below with reference to the attached drawing figures, wherein:

FIG. 5 is a table illustrating a reward computation, in accordance with an embodiment of the disclosed technology;

FIG. 6 is a table illustrating a gain computation using multiple iterations, in accordance with an embodiment of the disclosed technology;

DETAILED DESCRIPTION

Figure 1:
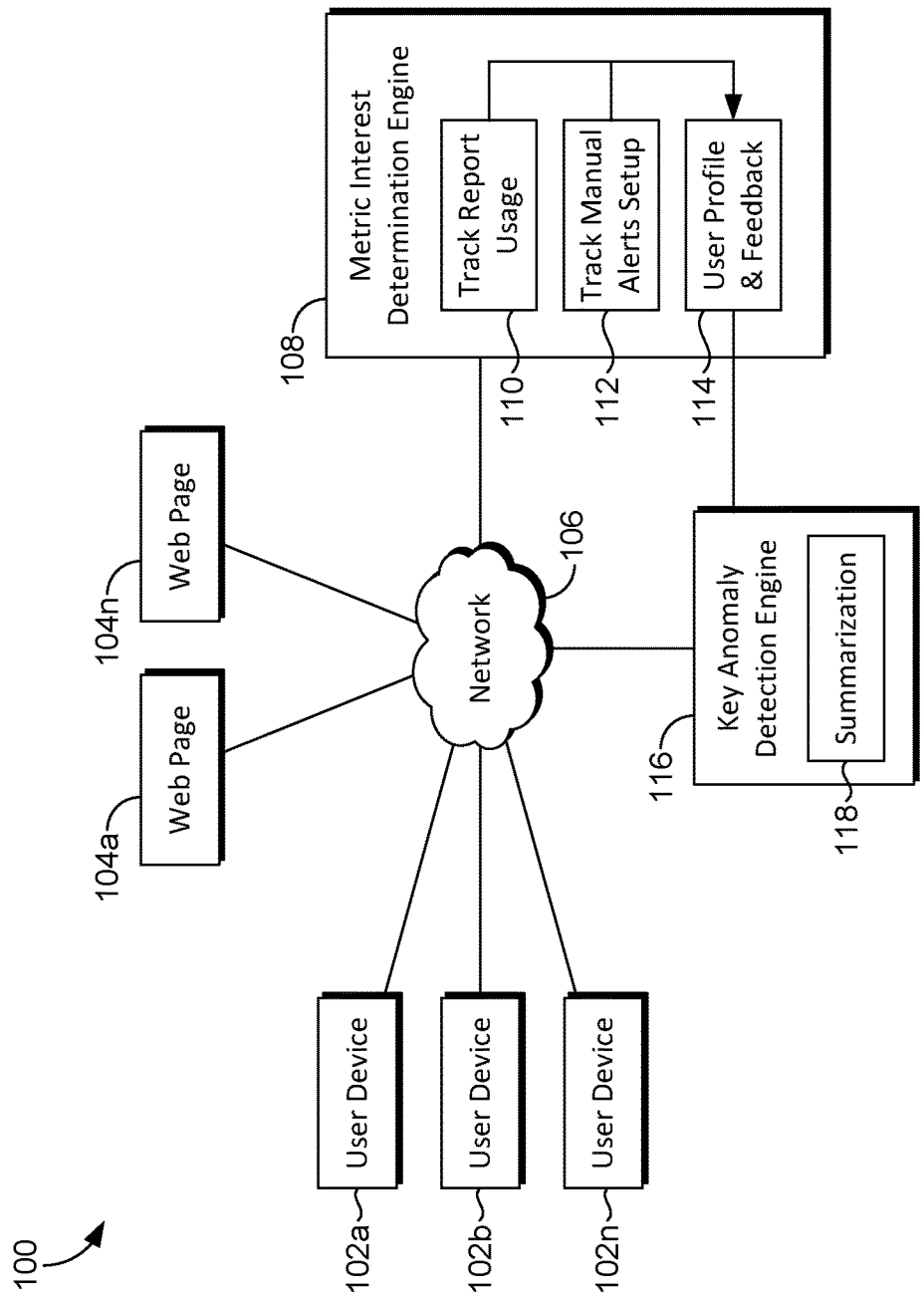
FIG. 1 is a block diagram of an exemplary operating environment suitable for use in implementing embodiments of the disclosed technology.

The subject matter of the disclosed technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Introduced here are techniques for generating customized marketer user profiles and for generating customized alerts. In some embodiments, the techniques involve acquiring past data, generating reports, and prioritizing/ranking metrics in the reports to create personalized ordering of the alerts. In some embodiments, the techniques involve a determination of which metrics are of most interest to a particular monitoring system user, and based on this determination, generating summaries of key anomalies for those metrics.

Monitoring system users, such as marketers, web designers, web page owners, web page analysts, etc., have a continued interest in inspecting data changes that occur in relation to web pages, applications, services, and other online tools. For example, a marketer may want to be informed about changes in data for a particular advertisement on a web page. This data may be collected by various systems, such as Adobe® Analytics. Typically, a marketer can provide an indication to the monitoring or analytics system as to which types of data that marketer is interested in. The marketer may request to be updated when a web page experiences a significant change in visits, cart additions, number of orders, etc. This data of a specific type that can be collected is referred to herein as "metrics." Metrics are typically motivated by consumer activities. However, because there could be thousands or even hundreds of thousands of metrics available, it would overwhelm any user who was presented with that much data. As such, understanding which metrics are of interest to the user would assist in providing only relevant updates in metrics to the user.

An exemplary aspect of the disclosed technology generates a user profile for a monitoring system user in terms of his/her preference about which metrics he/she would like to monitor. For this, the technology described herein utilizes past data about that monitoring system user's report consumption pattern, alerts set manually in the monitoring/analytics system (e.g., Adobe® Analytics), as well as explicit feedback from the monitoring system user regarding the relevance of the metrics shown in previous alert messages. The profile can thus be utilized in many ways, for example, to prioritize the reports, or to create a personalized ordering of the alerts. The profile can also be used while creating a personalized summary of the alerts generated at a given point of time.

Another aspect of the disclosed technology facilitates succinctly representing a given set of alerts to reduce alert fatigue for the monitoring system user. For this, the disclosed technology utilizes the correlation amongst the values of the metrics determined to be of interest to the monitoring system user, the severity and direction of the anomalies that are observed, and preference of the monitoring system user for the metrics. The summary generated may have a set of key anomalies for each metric, and a set of related anomalies for each key anomaly, thereby producing a succinct representation of the overall information, thus reducing alert fatigue. The alert summary may leverage the user profile with metrics of interest to the monitoring system user to personalize this summary. But in other aspects herein, the techniques can produce summaries even in the absence of such a profile. The alert summary provides the monitoring system user with knowledge as to how the corresponding metrics have changed within a period of time.

As mentioned above, the disclosed technology facilitates a way to represent a collection of anomalies detected over a single detection period in a succinct manner. As monitoring/analytics systems, such as Adobe® Analytics, track a large number of metrics and generate alerts for any anomalies detected for these metrics, the number of alerts generated at certain times can be overwhelming for users to digest. The metrics can be further divided based on segment, dimension, and granularity, which results in a large number of possible alerts. A segment, as used herein, refers to a segment of end users for whom the metric value is computed. A granularity, as used herein, is a time period used to measure metrics. Oftentimes, some metrics behave in a correlated fashion. For instance, if there is a threshold violation for one metric, with a high probability, but not certainty, several other metrics may also show a threshold violation. There may be a single root cause event that may lead to a large number of manual alert messages, which can lead to information overload and loss of productivity for the marketer, who may need to go through these messages and understand what corrective actions need to be taken.

To overcome the issues mentioned above, a succinct representation of all anomalies generated for a given detection window can be provided, which would address information overload and loss of productivity due to potentially large numbers of alert snippets, either through multiple messages or a single large message.

As an example, reports may be provided to users who have indicated an interest in receiving these reports (e.g., marketers, web page owners). A report, for instance, could be associated with a specific web page. The tracked data could include which visitors are visiting the site, what those visitors are viewing, which sources they are coming from, what they have done in the past, etc. Statistics could be broken down by countries, states, regions, etc. The system would be able to track a monitoring system user's usage pattern when viewing these reports to gain an understating of what the user is interested in, such as what the user viewed in the report. Tracking usage patterns is just one way that the system can gain this understanding.

Another way to gain an understanding as to a monitoring system user's interest in metrics is to track manual alerts set by users. A user, for example, may set up a manual alert in the system to track a particular metric. Because the user wants to receive alerts when data changes for that metric, the system can assume the user is interested in that particular metric. Still another way to understand what the user is interested in is to track the user's actions taken with particular alerts. For example, if the user receives an alert for a particular metric, the user may have the option to like/dislike that alert. This allows for explicit feedback by the user for that particular metric.

Once the system has gathered this information, a relevance score may be computed, which can then allow for metrics to be ranked for individual users. In embodiments, relevance is computed using a recency, frequency, monetary (RFM) based approach based on conditional probability. Recency, as used herein, refers to the number of time units since the current time period when the report was last accessed. Frequency, as used herein, refers to the frequency of the user opening reports during a time period. Monetary, as used in the RFM approach, refers to the duration for which the report is generated for the metric (i.e., the value of the metric from Jan. 1, 2015 to Jun. 30, 2015 would have a monetary value of 6 months and frequency of 1).

For instance, relevance for report usage may be the probability that the user will request a report with a metric in the next time period given that the user accessed a report with that same metric in the current time period a particular quantity of times. Once relevance values are computed, weights can be given to report usage and manual alerts. For instance, if the user always opens manual alerts and only sometimes uses/views reports, the manual alerts may be given a higher weight than report usage patterns. Also, all other variables remaining the same, if the frequency of metric consumption, for example, increases, the relevance also increases. As such, if one variable increases, the relevance value will either increase or not change, but would not decrease. The principle is that for a given metric and for a given user, the relevance score indicates the probability that the user will look at the particular metric more than once given that, in the past, the user has particular recency, frequency, and monetary values. While a report may discuss multiple metrics, the system may focus on the relevancy of individual metrics, not the relevance of the entire report to the user.

Having briefly described an overview of embodiments of the disclosed technology, an exemplary operating environment in which embodiments of the disclosed technology may be implemented is described below in order to provide a general context for various aspects of the disclosed technology. Referring initially to FIG. 1 in particular, an exemplary operating environment for implementing embodiments of the disclosed technology is shown and designated generally as environment 100.

The environment 100 of FIG. 1 includes user devices (102a, 102b, 102n), web pages (104a, 104n), a metric interest determination engine 108, and a key anomaly detection engine 116. Each of these components may be, or include, any type of computing device (or portion thereof) such as computing device 1000 described with reference to FIG. 10, for example. The components may communicate with each other via a network 106, which may include, without limitation, one or more local area networks (LANs) and/or wide area networks (WANs). Such networking environments are commonplace in offices, enterprise-wide computer networks, intranets, and the Internet. It should be understood that any number of advertiser devices, publisher devices, user devices, and video advertisement platforms may be employed within the environment 100 within the scope of the disclosed technology. Each may comprise a single device or multiple devices cooperating in a distributed environment. For instance, the metric interest determination engine 108 and the key anomaly detection engine 116 may be provided via multiple devices arranged in a distributed environment that collectively provide the functionality described herein. Additionally, other components not shown may also be included within the environment 100, while components shown in FIG. 1 may be omitted in some embodiments.

The user devices (102a, 102b, 102n) are generally configured to communicate with one or more web pages, applications, systems, etc. by way of the network 106. For instance, a marketer, analyst, or any other user using an analytics program, such as Adobe® Analytics, may want to be informed about changes in data to the web page, application, system, etc., so that the user can perform mid-course correction to campaigns in progress or to fine tune the web page, application, system, etc., being tracked.

The user devices (102a, 102b, 102n) may be any type of computing device owned and/or operated by a user who can access network 106. For instance, the user device (102a, 102b, 102n) may be a desktop computer, a laptop computer, a tablet computer, a mobile device, or any other device having network access. Generally, a user may employ a user device (102a, 102b, 102n) to, among other things, run an analytics program that has the capabilities to perform the functions described further herein. For example, a marketer working through user device 102a may use that device to access a web page, such as web page 104a or 104n. The marketer may want to monitor various statistics such as number of visits per day to that web page, sales of a particular item through that web page, etc. These statistics, termed metrics herein, may be monitored by the analytics system, which could provide updates to the marketer regarding metrics of interest.

Web pages (104a and 104n) may be accessed by any one of the user devices (102a, 102b, 102n). While web page may be used herein, it is used broadly to encompass applications (mobile or otherwise), systems, services, etc. As mentioned, user devices (102a, 102b, 102n) may be used by a marketer or other user to access data that the user wishes to monitor.

The metric interest determination engine 108 is generally configured to perform various functions, including to track report usage 110, track manual alerts setup 112, and for user profile and feedback 114. For each metric-to-user pair, the system may calculate a relevance-confidence score for each input source, including report usage and manual alerts. These individual scores may be combined into a consolidated score by the user profile module. As used herein, relevance is the level of interest a user indicates in a metric or dimension through interaction. Further, confidence, as used herein, is a measure of the confidence of the relevance score value for a monitoring system user for a specific metric over time (e.g., if the metric relevance value is calculated using a small number of data points, the confidence may be low, and if the metric relevance value is computed using a large number of data points, the confidence value may be large).

Initially referring to report usage 110, a report usage module may capture consumption patterns of how users access analytic reports through the web, such as through the network 106. For each user, the module tracks which metrics, calculated metrics, segments, and associated granularity are accessed by the user as present in the server logs. As briefly mentioned above, relevance is computed using a recency, frequency, monetary (RFM) based approach based on conditional probability. More details in relation to computing relevancy will be discussed below in reference to FIG. 2.

Now referring to the manual alerts setup 112, a manual alerts module is generally configured to track whether a user has set up a manual alert. This indicates that the user is interested in that metric, and as such, the system may assign, for example, a score of 1.0 to relevance and confidence for that user-metric pair. Manual alert checking and consumption information can be used to enhance relevance computations.

Regarding user profile and feedback 114, the user profile (e.g., operated by a user profile module) may maintain a consolidated relevance-confidence (RC) score from each input. The consolidated score is a weighted combination of the individual scores. The weights are obtained from a linear regression model, where the predictors are RC scores from each input source and the dependent variable is an engagement score, which is a weighted sum of the number of opens (e.g., a user opening an alert), upvotes (e.g., user explicitly indicating a like/interest of an alert), and downvotes (e.g., user explicitly indicating a dislike/disinterest of an alert) the user has performed on an alert with the metric being observed. Observations for each user-metric pair are used in model building. The user profile model generally performs several functions, including managing the profile data of users, and incorporating user responses to refine the system.

In embodiments, each user is assigned a user profile. This user profile for a monitoring system user contains relevance and confidence scores for each metric from multiple input sources (e.g., report usage and manual alerts). The user response is used to determine the alert influence for each user-metric pair. Feedback, as described above (e.g., upvotes, downvotes, opening alerts), is used to combine the multiple different relevance and confidence scores to generate a consolidated alerting influence of the metric for the user. This is computed for all the user profiles. The importance of a user in the organization (e.g., marketer or CEO)

may also be used, in addition to the alert influence for each user and metric to determine which metrics to an anomaly detection program on, discussed in more detail herein. More details in relation to computing feedback will be discussed below in reference to FIG. 2.

Referring now to the key anomaly detection engine 116, it is generally configured to generate a set of key representative anomalies that best represent the set of all detected anomalies, assign a set of anomalies as being related to each key anomaly, generate a graph representation of the anomalies and the underlying metrics, determine how many key anomalies to select, and generate a personalized set of representative anomalies for each user based on their interests in the underlying metrics.

As mentioned herein, several metrics may behave in a correlated fashion. In this regard, if there is a threshold violation for one metric, there is a high probability that other metrics may also show a threshold violation. One single root-cause event may lead to a large number of manual alerts being fired and the marketer being inundated with a large number of alert messages. This leads to information overload and loss of productivity for the user to go through these messages and understand what corrective actions could be taken. As such, the key anomaly detection engine 116 is used to provide a succinct representation of all anomalies generated for a given detection window. The system applies thresholds to detect if a particular metric value is within an expected range or not. If the metric value is outside of the expected range, it may be termed an anomaly, as used herein. A collection of anomalies is represented by selecting a set of key anomalies and a set of related anomalies for each key anomaly such that the key anomaly represents the overall set of anomalies in the most representative fashion, personalized for the monitoring system user.

Figure 2:
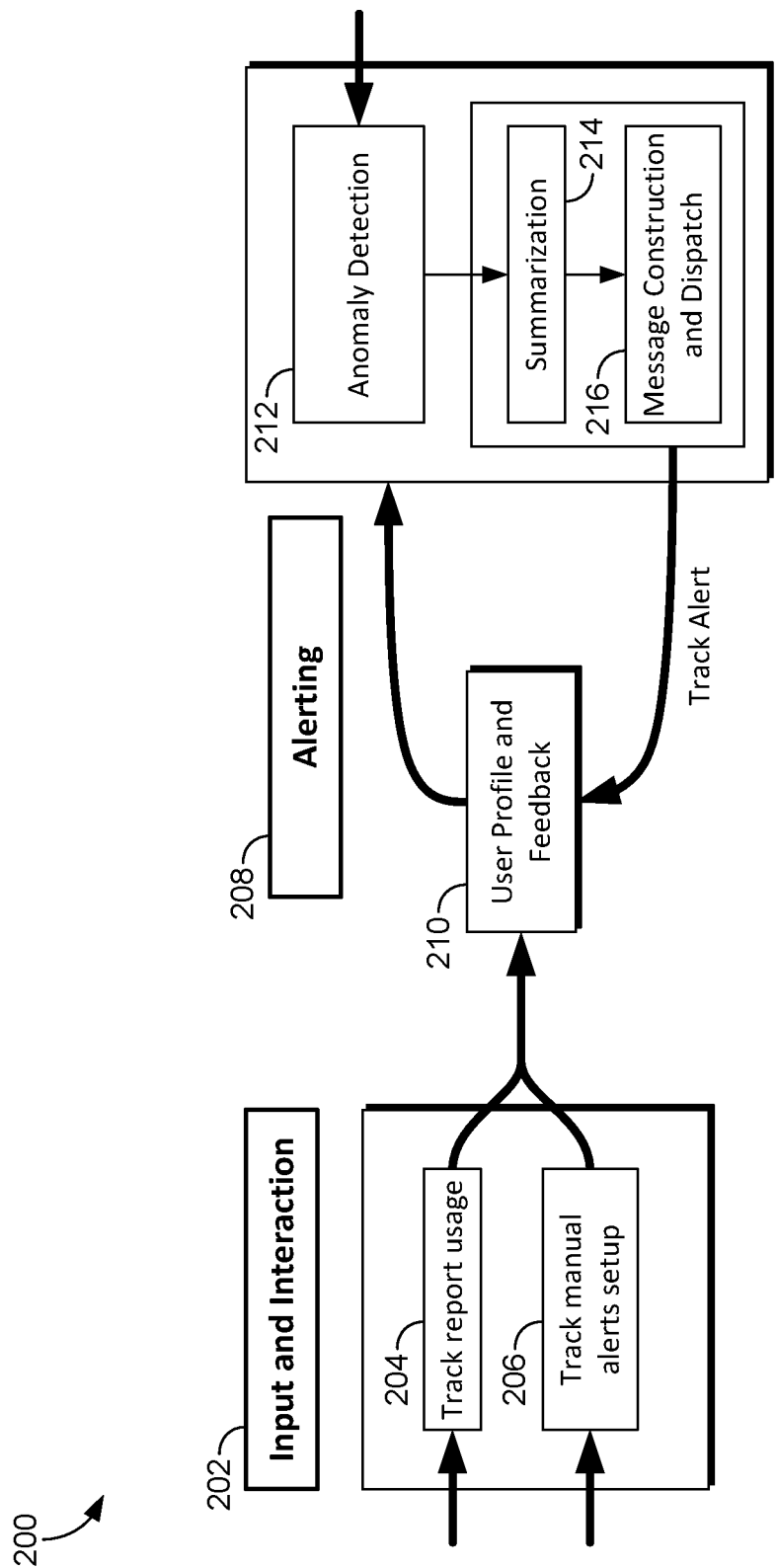
FIG. 2 is a block diagram of an overall input-interaction and user profile-feedback system, in accordance with an embodiment of the disclosed technology.

Turning now to FIG. 2, a block diagram 200 is depicted of an overall input and interaction and user profile-feedback system, in accordance with an embodiment herein. As has been described herein, there are two parts discussed to the overall system. The first is the input and interaction portion 202, which includes tracking report usage 204 and manual alerts set up 206. This may also include the user profile and feedback loop 210. The second part is the alerting portion 208, which detects anomalies 212, then further summarizes them 214 and constructs messages 216 to send to the user.

Tracking report usage 204 may comprise a computation of relevance. Equation (1) below illustrates an exemplary relevance calculation.

$$r(a_{i,k+1} \geq 1 \mid a_{i,k} \leq a, b_{i,k} \leq b, d_{i,k} \leq d) = \frac{\sum_{j=1}^{k-1} \mathbb{1}(a_{i,j+1} \geq 1, a_{i,j} \leq a, b_{i,j} \leq b, d_{i,j} \leq d)}{\sum_{j=1}^{k-1} \mathbb{1}(a_{i,j} \leq a, b_{ij} \leq b, d_{i,j} \leq d)}$$

Equation (1)

In equation (1) above, $a_{i,k}$ refers to the number of times that a metric, $m_i$, found in a report, is requested by a user u in time period k and captures the frequency of access. $B_{i,k}$ captures the recency of the report access. It is computed as the reciprocal number of time periods between a last report access and time period k. The more recent the access, the higher its value. $D_{i,k}$ is a function of the duration for which reports were generated for the metric and indicates the monetary value of the metric. Relevance for report usage is the probability r in Equation (1) that the user will request a report with a metric $m_i$ in the next time period given that the user has accessed a report with metric $m_i$ in the current time period at most a number of times, and recency and monetary values being at most b and d, respectively.

Continuing in reference to equation (1) above, $\mathbb{1}$ is an indicator function and n denotes the denominator in this equation. The last $k^{th}$ time period is accounted for in the numerator of this equation. Viewing the right hand side of the equation as the mean of the sum of n independent Bernoulli random variables, the standard error is represented by se, which is the standard deviation of the probability distribution of relevance viewed as a random variable. The standard error se is computed by $\sqrt{r(1-r)/n}$. The confidence associated to relevance r is given by $$c = \frac{1}{se}.$$

The confidence function can be normalized so that it takes values in the interval [0,1].

The duration of a time period can vary, and can be set in the code. The ≤inequality in the formulation ensures monotonicity, which is represented by Equation (2) below.

$$p(a_{i,k+1} \geq 1 \mid a_{i,k} \leq a, b_{i,k} \leq b, d_{i,k} \leq d) \leq p(a_{i,k+1} \geq 1 \mid a_{i,k} \leq a+1, b_{i,k} \leq b, d_{i,k} \leq d)$$

Equation (2)

While the above describes a particular embodiment of an algorithm, others may also be used. For instance, the Logistic Regression algorithm (parametric), the Naradaya-Watson algorithm (non-parametric), the Nearest Neighbor algorithm (non-parametric), or the Sigmoid-based RFM (non-parametric) algorithm may be used instead.

Utilizing the user profile and feedback component 210, feedback may be realized in the form of a linear combination of upvotes, downvotes, and opens of the alerts, and thus of the metrics for each user, as described above in regard to FIG. 1. Equation (3) below computes feedback. For a metric m and user u, F(m,u) denotes feedback or user response.

$$F(m,u) = \alpha \cdot (\Sigma_{X=U,D,O} \lambda_X X_K(m,u)) + \frac{1}{3} \cdot (1-\alpha) \cdot (\Sigma_{X=U,D,O} \lambda_X X_R(m,u))$$

Equation (3)

In Equation (3) above, $U_k(m,u)$, $D_k(m,u)$ and $O_k(m,u)$ denote the number of times the metric m was upvoted, downvoted, and opened by user u, respectively, when it was a related anomaly. Here, $\lambda_U$, $\lambda_D$, and $\lambda_O$ are the weights associated with upvotes, downvotes, and opens, respectively. For exemplary purposes only and not limitation, $\lambda_U=1$, $\lambda_D=-1$, and $\lambda_O=0.5$. Here, $\alpha$ denotes the weight given to the metric when it is treated as a key anomaly while calculating the feedback. In an embodiment this value may be 0.5. The denominator is 3, as shown in Equation (3) above, to spread credit among the three related anomalies and this may generalize to any number of related anomalies. The feedback function F(m,u) can be more general in nature to accommodate corresponding alert message layouts. F(m,u) may be treated as the target variable to predict the RC score from each input source as predictors in a linear model. This is illustrated in Equation (4) below.

$$F(m,u) = w_0 + \Sigma_{i=1}^{k} w_i \cdot r_i(m,u) \cdot c_i(m,u)$$

Equation (4)

In Equation (4) above, the relevance-confidence score for the two different input sources are $r_1(m,u)$ and $c_1(m,u)$ for report usage and $r_2(m,u)$ and $c_2(m,u)$ for manual alerts. This provides the system with the weights for each input source. The term $w_0$ is the intercept in the model. Weights may then be used to score user-metric pairs to generate an alert influence score, which, as used herein, is the system's estimate or prediction of F(m,u). AI(m,u) is used in Equation (5) below instead of the conventional notation of $\hat{F}$(m,u) to represent the system's prediction of F(m,u).

$$AI(m,u)=w_0+\Sigma_{i=1}^2 w_i \cdot r_i(m,u) \cdot c_i(m,u) \qquad \text{Equation (5)}$$

The above computation may be achieved in an incremental manner. For a first iteration, for example, relevance is computed, and confidence and feedback may be obtained for each user, and for each metric in the time $\Delta T$. The values of $AI(m,u)_T$ and $AI(m,u)_{\Delta T}$ are used to determine a final alert importance score, which can be calculated as follows:

$$AI(m,u)_{final}=\beta \cdot AI(m,u)_{\Delta T}+(1-\beta) \cdot AI(m,u)_T \qquad \text{Equation (6)}$$

In an aspect, $\beta=\frac{1}{2}$. The $\beta$ factor controls the decay of the alert importance score. An alternative approach could employ Bayes' Theorem to update AI. An alternate approach to define F(m,u) will be to just consider opens. That is, take $\lambda_U=0$, $\lambda_D=0$, and $\lambda_O=1$ in equation (3). Upvotes and downvotes may be used as predictors along with the relevance-confidence coming from the different sources. A logistic regression model may be fit on opens and AI(m,u) is then defined as a propensity to open the alert. The rest of the steps may be the same as described above. This model will predict the opening of an alert instead of predicting overall engagement with the alert.

Regarding the summarization component 214, one focus of this component is to identify key anomalies, as further described herein in regards to FIG. 1. An exemplary method of identifying key anomalies is to use the Iterative Greedy Algorithm as follows:

Reward for node=$f$(severity,interest,confidence)

For example: Reward=severity*interest*confidence

Edge weight $W$=correlation between the source node and target node

An exemplary reward-based algorithm is shown in Table 1 below.

TABLE 1

Reward-Based Algorithm
Algorithm 1 Reward-Based Algorithm

Given: Graph G(V,E,W), reward R, cost C and budget B
Initialize: vertices U = V, residual budget b = B, solution set S = {}
while min (C$_{v_i}$ : v$_i$ ∈ U) ≤ b and |U| > 0 do
  for v$_i$ ∈ U do
    G(v$_i$) = $\Sigma_{j=1}^{|V|}$ (r$_j$ * w$_{ij}$)
  end for v$_i$ = argmax $\frac{G(v_i)}{C_{v_i}}$ where v$_i$ ∈ U, C$_{v_i}$ ≤ b S = S ∪ v$_i$; U = U − v$_i$; b = b − c$_{v_i}$;
  for v$_j$ ∈ U do
    r$_j$ = r$_j$ * ( 1 − w$_{ij}$)
  end for
end while Additional details regarding the key anomaly detection engine and the summarization component 214 will be discussed in more detail herein, specifically in regards to FIGS. 3-6.

Figure 3:
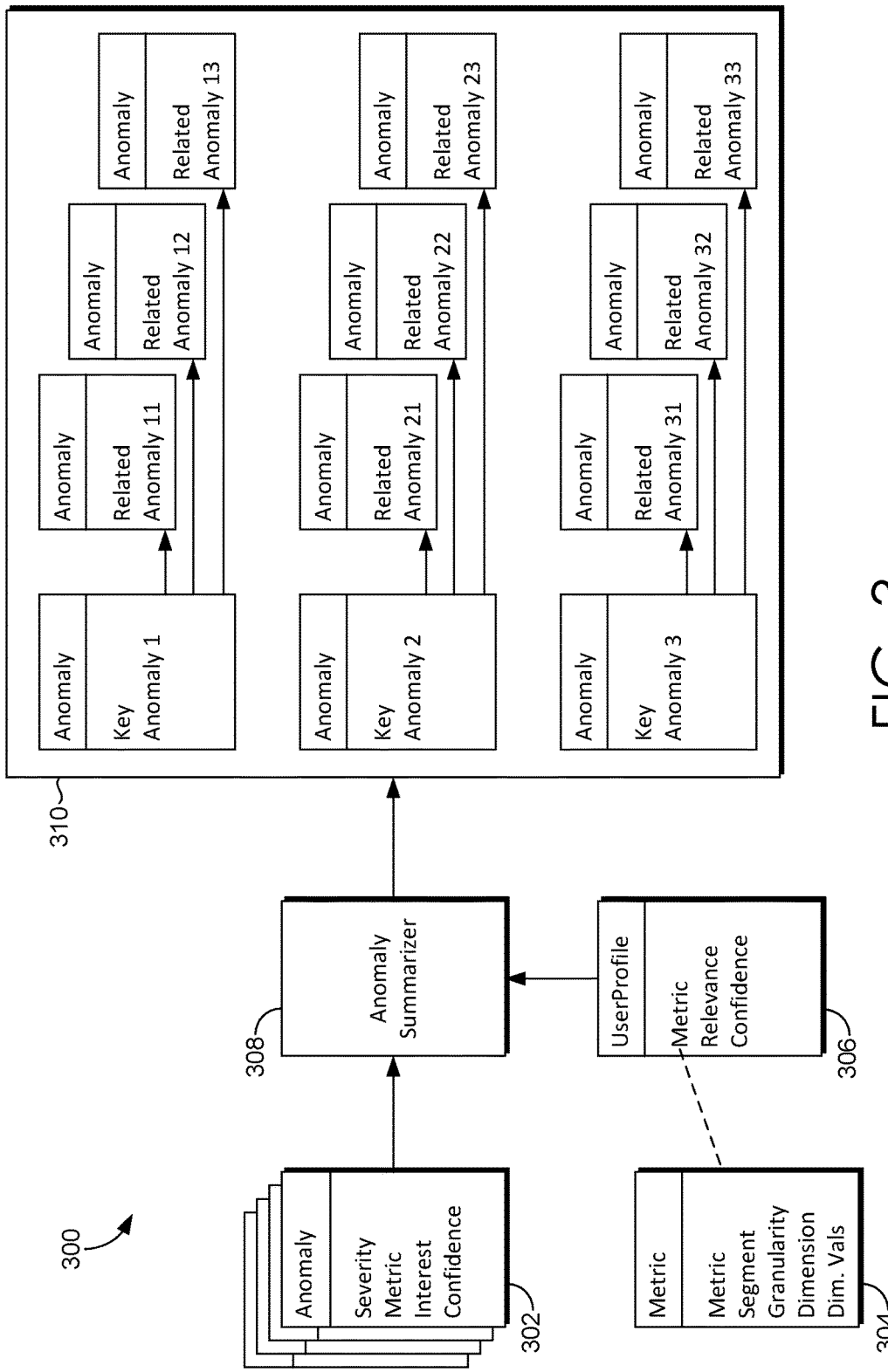
FIG. 3 is a block diagram of alert summarization, in accordance with an embodiment of the disclosed technology.

FIG. 3 is a block diagram 300 of alert summarization, in accordance with an embodiment herein. Initially, item 302 represents a plurality of anomalies, where each of these anomalies has a severity, interest, and confidence score, and each represents a particular metric. Item 304 represents a metric, which has a segment, granularity, dimension, and dimension value(s). Item 304 is a pre-processing step prior to the anomalies being processed and summarized. An example of a metric having a segment, granularity, dimension, and a dimension value is as follows:

Metric: Revenue
Segment: People with gender "female" and age between 30-39
Granularity: Hourly
Dimension: County
Dimension Value: United States The above example represents that a user is interested in the revenue for one-hour time slots for people who are females, ages between 30-39, living in the United States.

Item 306 represents a user profile, where scores are added for a monitoring system user and for a particular metric. For instance, user profile 306 may include, for each metric, a relevance and confidence score, which can be combined to create an RC score. The anomaly summarizer 308, (summarization module 118 of FIG. 1) is generally responsible for identifying key and related anomalies, and determining how to provide this information to a user in a summarized form. Output of the anomaly summarizer 308 may include, for example, the output illustrated in box 310.

Output 310 illustrates that three key anomalies have been identified (key anomalies 1, 2, and 3). For each key anomaly, multiple related anomalies have been identified. For instance, for key anomaly 1, related anomalies 11, 12, and 13 have been identified. For key anomaly 2, related anomalies 21, 22, and 23. For key anomaly 3, related anomalies 31, 32, 33.

Figure 4:
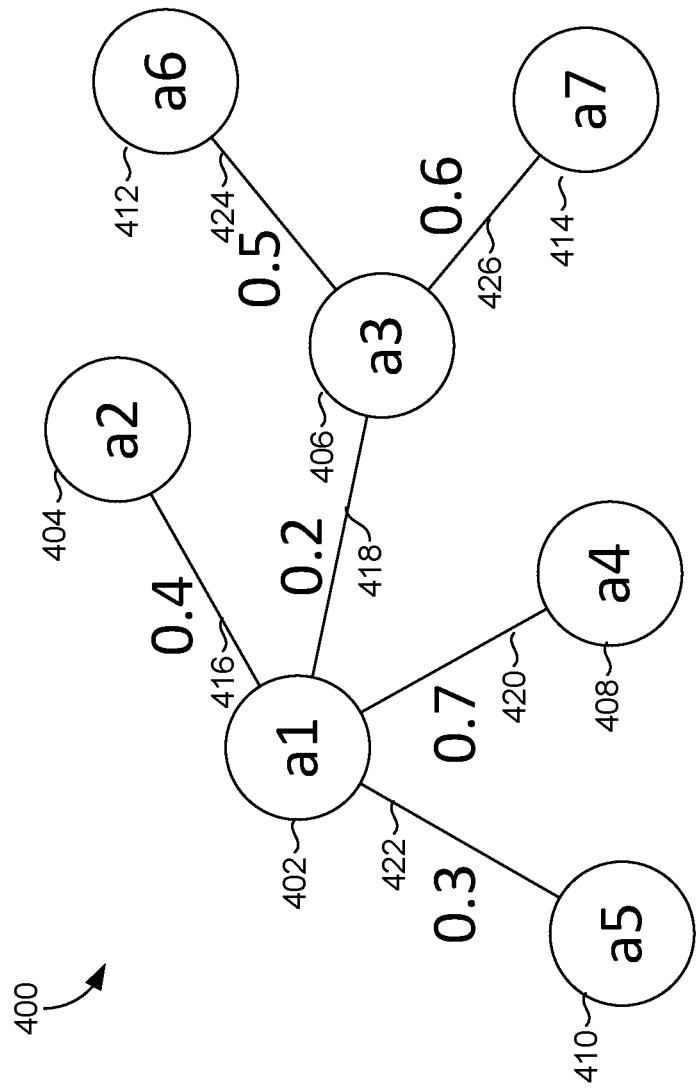
FIG. 4 is a metric correlation graph, in accordance with an embodiment of the disclosed technology.

Turning now to FIG. 4, a metric correlation graph 400 is provided, in accordance with an embodiment herein. In some embodiments, the system may generate a graphical representation of a set of metrics from which anomalies are detected. As mentioned above, an anomaly, as used herein, is an observed value of a metric which is beyond the expected range. In graph 400, each of nodes a1-a7 (reference numerals 402-414, respectively) corresponds to an anomaly, where each anomaly corresponds to an underlying metric. A severity of an anomaly, as used herein, indicates how much beyond the observed value the metric is, compared to the expected range. That is, put in a different way, the severity indicates a level of disagreement between expected and observed values of the metric. The severity may have a magnitude, as well as a sign (+ve or −ve). To generate the graph, the set of metrics having a corresponding anomaly is represented as the anomalies and the set of vertices, as shown in FIG. 4. As will be discussed in more detail below, the edges/vectors represent the ability of an anomaly represented by the source node to capture the information content of the anomaly represented by the target node. A higher edge weight implies that knowing about the anomaly represented by the source node provides more information about the anomaly being represented by the target node. The value of the edge weight is limited to the [0,1] range (closed interval). The absolute value of the correlation between the metrics underlying the anomalies is thus the edge weight.

A notion of reward is associated with each of the nodes (metrics). Here, the reward for a node is a function of three factors. The first factor is the observed or inferred interest of the consumer of the alert message in the metric. Computing the interest factor may comprise a computation based on the number of times the marketer has interacted with the system regarding a particular metric (e.g., by viewing reports about the metric, setting up manual alerts based on a threshold of the metric). Other ways are certainly possible for computing the interest factor. The second factor is the confidence in the interest level (first factor) computed. In one aspect, the confidence factor is computed based on the number of occurrences and recentness of the user viewing reports, setting up manual alerts, etc. The third factor is the magnitude of the severity of the anomaly. It is expected that once all three factors have been combined, the result will be a non-negative number. The reward is computed by multiplying each of the three factors for each anomaly, which, as mentioned, is expected to be positive or zero. As these factors are computed on a per user basis, the reward scores are also personalized, which leads to a personalized summary for each system user.

These three factors are illustrated in FIG. 5 for the anomalies of FIG. 4. FIG. 5 is a table 500 illustrating a reward computation, which, as mentioned, is computed using the values of severity, interest, and confidence. Each anomalies a1-a7 (reference numerals 402-414, respectively) has unique scores for these factors, and thus for the reward score.

Referring back to FIG. 4, in addition to the values computed above, each edge in the graph may be assigned a weight value. As shown, each node in graph 400 has an edge weight for each neighboring node. The edge weights are represented by vectors 416, 418, 420, and 422. Therefore, for a1 402, there is an edge weight for a2 404 (vector 416), a3 406 (vector 418), a4 408 (vector 420), and a5 410 (vector 422). For node a3 406, there is an edge weight for a1 402 (vector 418), a6 412 (vector 424), and a7 414 (vector 426), and so on. The edges/vectors represent the ability of an anomaly represented by the source node to capture the information content of the anomaly represented by the target node. A higher edge weight implies that knowing about the anomaly represented by the source node provides more information about the anomaly being represented by the target node. The value of the edge weight is limited to the [0,1] range (closed interval). The absolute value of the correlation between the metrics underlying the anomalies is thus the edge weight. This correlation can be taken over a particular period of time, such as, for exemplary purposes only, 60 days, but not older than 90 days, such that the correlation is re-computed once every 30 days or so. In one embodiment, if two anomalies have same (+/-) sign (polarity) but their correlation is negative, or if they have different sign but their correlation is positive, the edge weight is taken as 0, since the correlation cannot explain the anomalies because of inconsistency in polarity.

There are different methods available for computing the correlation. For example, the Pearson correlation coefficient may be used, or some other suitable correlation definition. The edge weights may also be assigned based on other factors, as long as the edge weight continues to convey how much information that anomaly on the metric corresponding to the source node conveys regarding the anomaly observed on metric corresponding to the target node in the graph.

In an embodiment, once the graph is constructed, key anomalies are identified. Key anomalies are a subset of nodes (representing anomalies) that capture as much information about the overall set of anomalies, while limiting (or minimizing) the number of key anomalies. A gain is computed, which is defined for a given node (anomaly) as the sum of the product of edge weights and reward for each of the neighboring nodes. The edge weight from any node to itself is always one (1), so the reward for the node is included in the gain. The gain for the node vi is computed using Equation (7) below.

$$G_i = \sum_{i=1}^{n_i} R_j * w_{ij}$$ Equation (7)

A node is selected as a key anomaly, for example, in an iterative greedy manner by selecting a node which gives the maximum value of gain in a given iteration. Once a node is selected, the rewards for all other nodes are updated to reflect the fact that nodes that are similar to it are no longer very informative. The updated reward (also termed next reward) is computed as follows:

$$R_m = R_m * (1 - w_{im})$$ Equation (8)

The gain values may be computed once again for all nodes except those that have been selected as key anomalies. The node(s) with the highest gain are selected, followed by an update to the reward values. FIG. 6 is a table 600 illustrating a gain computation using multiple iterations, in accordance with an embodiment herein. Along with the nodes (anomalies) from the metric correlation graph of FIG. 4, table 600 illustrates a gain computation for a first iteration, along with gain values for the first iteration and second iteration. The gain iterations may continue until it is determined that no other key anomalies should be selected.

With continued reference to FIG. 6, taking the first iteration gain computation for a1 402 as an example, the computation is shown as multiplying correlations and reward values for each node is direct relation to a1 402 (a2 404, a3 406, a4 408, and a5 410), including a1 402 itself. Therefore, the computation is 0.6 (a1 402 reward)+0.4 (correlation of a1 402 to a2 404)*0.6 (a2 404 reward)+0.2 (correlation of a1 402 to a3 406)*1.0 (a3 406 reward)+0.7 (correlation of a1 402 to a4 408)*1.8 (a4 408 reward)+0.3 (correlation of a1 402 to a5 410)*0.5 (a5 410 reward). This computation leads to a gain value for a1 402 of 2.45. As shown, when the gain values for a1-a7 (reference numerals 402-414, respectively) are compared, a1 402 has the largest gain value. As such, a1 402 has been chosen as a first key anomaly, and the second iteration is just done for nodes a2-a7 (reference numerals 404-414, respectively). This process would continue until it is determined that there are enough key anomalies.

For the second and subsequent iterations, the next reward may be computed by multiplying the reward from table 500 of FIG. 5 by (1-edge weight for selected node), as shown in Equation 8 above. A1 402 does not have a next reward value, as it has already been selected as a first key anomaly. Taking a2 404 as an example, the next reward is computed by multiplying the reward (0.6) by 1-the edge weight between a1 402 and a2 406. Therefore, the equation would be 0.6*(1-0.4)=0.36. The same computation would be done for a3-a7 (reference numerals 406-414, respectively).

There are several methods for determining when to stop identifying key anomalies. Three such methods are discussed here. The first method is the top-k approach. The user may specify the number of key anomalies to be found as 'k'. In this case, the anomalies with the highest gain are selected as the key anomalies until we have found k anomalies, where k is any predetermined number. For instance, a user may specify that three key anomalies are to be identified. The system would stop after finding the top three anomalies.

The second method uses the ratio of gain in successive iterations to decide the cutoff of key anomalies. If the gain in the $k^{th}$ iteration is Gk and the gain in the $(k+1)^{th}$ iteration is G(k+1), then key anomaly selection stops after selecting k anomalies if G(k+1)<Gk*a where 0<a<1 is a user supplied parameter. The informativeness of the next anomaly, if it were to be selected as a key anomaly, is less than a given fraction of the last selected anomaly. This provides for selection of key anomalies that provide significant informativeness compared to non-key anomalies.

The third method uses the total gain achieved up to k iterations as a stopping criterion. If the gain achieved by the first k-anomalies becomes at least β fraction of the total gain that could have been achieved (e.g., could be computed as the sum of all rewards before any updates have been made to the rewards calculation), the identification of key anomalies stops. β is a user supplied parameter. For example, the user may specify the beta value to be 0.65. The total possible gain would be 5.9 (the sum of rewards of all nodes in the beginning). Hence, the computation would stop after selecting anomalies such that the sum of gain should be 3.835. In this case, the gain for the first selected node a1 402 is 2.45 and the gain for second selected node a3 is 1.56, so the total gain after two iterations is 4.01. Hence, if value of beta is 0.65, then the computation of key anomalies would stop after selecting two key anomalies.

Once key anomalies are identified, related anomalies for each key anomaly may then be identified. Related anomalies, as used herein, are anomalies that behave similarly to a key anomaly. The similar behavior can be captured by a high degree of correlation and a sign in the anomalies that is consistent with the observed correlation. For example, if revenue and page views metrics are positively correlated and the observed anomalies for both of these metrics on a given day are positive, then page views can be a related anomaly for revenue as a key anomaly, or vice versa. Also, to the contrary, if "cart additions" is positively correlated with revenue, but on a particular day, "cart additions" has a negative anomaly and revenue has a positive anomaly, then the anomaly of "cart additions" would not be a related anomaly for the revenue anomaly as a key anomaly.

In one embodiment, once one or more key anomalies have been identified, related anomalies can be identified. For each non-key anomaly, the key anomaly for which it has the highest edge weight value is identified. In some instances, a non-key anomaly may have only one key anomaly to which it is connected, such as anomaly a2 of FIG. 4. But in other cases, a non-key anomaly may have multiple key anomalies to which it is connected, and thus the edge weight values would be compared to find the highest one. This non-key anomaly is then associated as a related anomaly for that key anomaly for which the edge weight value is the highest. In some cases, a threshold is applied to determine if the anomaly is related to the key anomaly.

Related anomalies may also be assigned to key anomalies while finding the key anomalies. For this, when a first key anomaly is selected based on the maximum gain criterion, the contribution of a given anomaly (non-key anomaly) to the selection of the key anomaly is considered. For example, if anomaly of node $v_i$ is selected as the key anomaly, its gain would have been:

$$G_1 = \Sum_{i=1}^{n} R_j * w_{ij} \quad \text{Equation (9)}$$

The contribution of anomaly on metric $v_k$ to the gain on anomaly on metric $v_i$ is:

$$R_k * w_{ik} \quad \text{Equation (10)}$$

A user-specific quantity of the highest contributing anomalies is selected for each key anomaly as related anomalies. This may be subjected to a minimum threshold to qualify as a related anomaly. The anomaly selected as a related anomaly, in one embodiment, may not be considered as a related anomaly for any other key anomaly. Additionally, a user may choose to bar these related anomalies from appearing as key anomalies later, or they may be removed from a related anomalies list for the previous key anomaly if they later get picked as a key anomaly.

Figure 7:
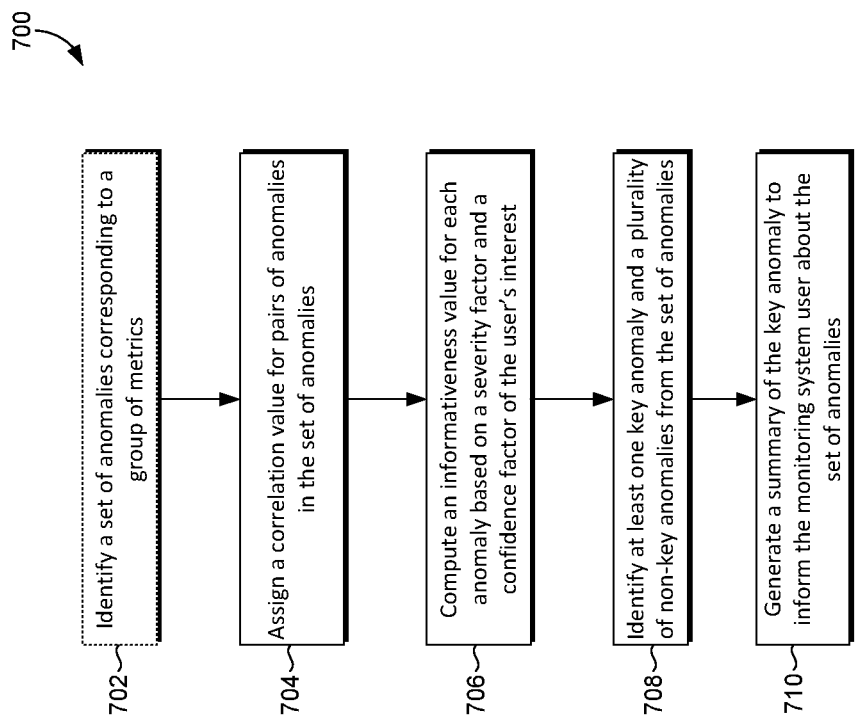
FIG. 7 is a flow diagram showing a method for summarizing a set of anomalies corresponding to a group of metrics of interest to a monitoring system user, in accordance with an embodiment of the disclosed technology.

FIG. 7 is a flow diagram showing a method 700 for summarizing a set of anomalies corresponding to a group of metrics of interest to a monitoring system user, in accordance with an embodiment herein. Initially, at block 702, a set of anomalies corresponding to a group of metrics is identified as having values that are outside of a predetermined range. As mentioned, an anomaly is defined as an observed value of a metric that is beyond an expected range. Said in a different way, an anomaly represents a change in data for a corresponding metric. Anomalies are identified when the corresponding metric has a detected value that is beyond the expected range. At block 704, a correlation value is assigned to at least a portion of pairs of anomalies in the set of anomalies. A correlation value is also referred to herein as an edge weight between two nodes, such as two anomalies. Generally speaking, a correlation value represents a degree of correlation between the pairs of anomalies in the set of anomalies. As further described herein, there are different methods available for computing the correlation value. For example, the Pearson correlation coefficient may be used, or some other suitable correlation definition. The edge weights may also be assigned based on other factors, as long as the edge weight continues to convey how much information that anomaly on the metric corresponding to the source node conveys regarding the anomaly observed on metric corresponding to the target node in the graph. For example, the correlation value may indicate an ability of a first anomaly of a pair of anomalies to capture information content of a second anomaly of the pair of anomalies.

At block 706, an informativeness value is computed for each anomaly in the set of anomalies. The informativeness value indicates how informative each anomaly is to the monitoring system user. In one aspect of the disclosed technology, the informativeness value, also termed a reward value, is computed based on, at least, a severity factor for each anomaly (e.g., how severe the deviation of the metric value is from the expected range), and a confidence factor representing a confidence of the monitoring system user's interest in each anomaly. In other aspects, an interest factor may be used in this computation, which indicates the interest level of the monitoring system user in that particular metric.

At block 708, at least one key anomaly and a plurality of non-key anomalies are identified from the set of anomalies. This may be based on, for instance, the computed correlation values and the informativeness values. The key anomaly is identified as being able to represent information about the set of anomalies to the monitoring system user. For example, a first key anomaly may be selected because, at least in part, on its ability to represent information about the set of anomalies to the monitoring system user. In some embodiments, a set of related anomalies is identified for each key anomaly. The related anomalies may be found by identifying, for each non-key anomaly, a key anomaly having the highest correlation value corresponding to that particular non-key anomaly. The non-key anomaly and key anomaly are then associated to one another. For anomalies that are found to be related, their corresponding metrics are causally dependent on one another.

As discussed herein, the number of key anomalies identified may vary based on the method used to make this determination. In one instance, an iterative process in a gain computation is used when identifying key anomalies. As such, a first key anomaly may be identified from a first iteration of the gain computation, and a second key anomaly may be determined from a second iteration of the gain computation. This is shown and described in more detail in FIG. 6. Alternatively, multiple key anomalies may be determined from a single iteration of the gain computation. For example, two key anomalies having the highest gain value may be selected as the first two key anomalies, but others may be selected during subsequent iterations of the gain value computation. In some aspects, the quantity of key anomalies selected is a predetermined quantity. In other aspects, a second key anomaly may be selected if the second key anomaly meets a predetermined informativeness threshold that is less than the informativeness of the first key anomalies. Other methods for determining how many key anomalies to select are discussed in more detail herein.

At block 710, a summary of the identified key anomalies is generated to provide information to the monitoring system user about the set of anomalies for a particular time period. The summary provides many advantages to the monitoring system user that have not been previously addressed in the art. For instance, the, the summary allows the monitoring system user to receive one report/summary that addresses many anomalies in which the monitoring system user is interested, and does it succinctly. This significantly cuts down on the amount of data the monitoring system user has to go through to understand the change in data of all of the metrics of interest.

Figure 8:
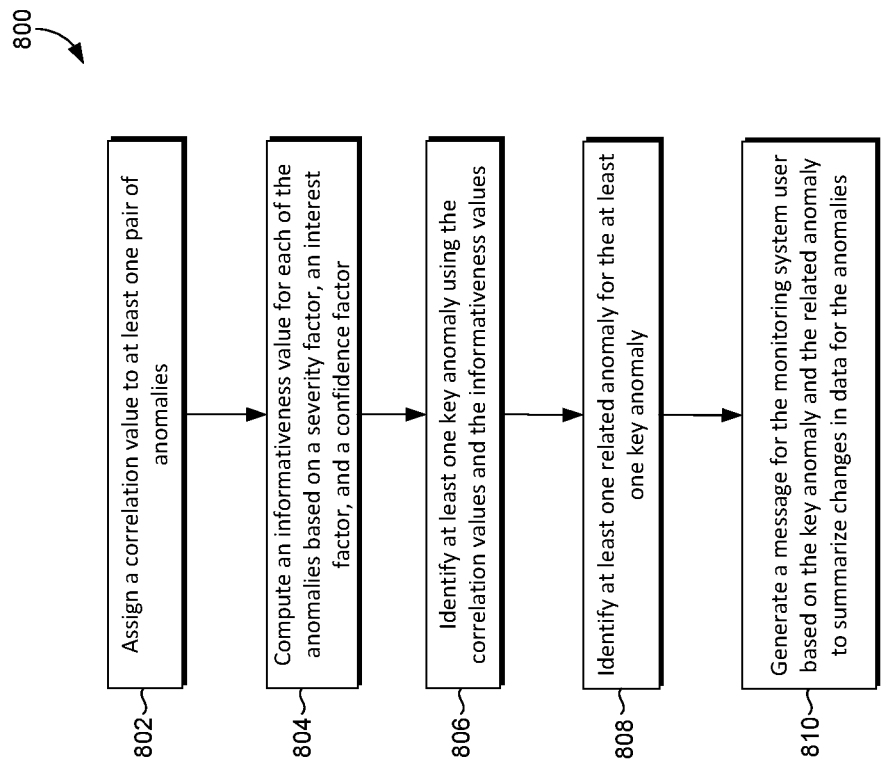
FIG. 8 is a flow diagram showing another method for summarizing a set of anomalies corresponding to a group of metrics of interest to a monitoring system user, in accordance with an embodiment of the disclosed technology.

FIG. 8 is a flow diagram showing another method 800 for summarizing a set of anomalies corresponding to a group of metrics of interest to a monitoring system user, in accordance with an embodiment herein. The set of anomalies may be identified, in an aspect of the disclosed technology, within a single detection window of time. At block 802, a correlation value is assigned to at least one pair of anomalies, indicating how much information a first anomaly in the pair conveys in relation to a second anomaly of each pair of anomalies. As mentioned, each anomaly represents a change in data for a corresponding metric, such that a metric may become an anomaly if the value of the metric is outside an expected range. As such, each anomaly has a corresponding metric. As further described herein, there are different methods available for computing the correlation value. For example, the Pearson correlation coefficient may be used, or some other suitable correlation definition. The edge weights may also be assigned based on other factors, as long as the edge weight continues to convey how much information that anomaly on the metric corresponding to the source node conveys regarding the anomaly observed on metric corresponding to the target node in the graph. For example, the correlation value may indicate an ability of a first anomaly of a pair of anomalies to capture information content of a second anomaly of the pair of anomalies.

At block 804, an informativeness value is computed for each anomaly. This value is computed based on, at least, a severity factor, an interest factor, and a confidence factor (e.g., how confident the monitoring system is in the monitoring system user's interest in each anomaly). This value may be computed, for example, by multiplying the severity factor, the interest factor, and the confidence factor. The severity factor is specific to the metric value (e.g., how far outside the expected range the value is) and the interest and confidence values are specific to the monitoring system user. The correlation values are then used, along with the informativeness values (also termed reward values herein), to compute a gain value for each anomaly. For a first iteration of the gain value computation, a first key anomaly may be selected as having the highest gain value. Subsequent key anomalies may then be identified based on subsequent computation iterations of informativeness and gain values.

At block 806, from the plurality of anomalies, at least one key anomaly is identified based, at least, on the assigned correlation values and the computed informativeness values. Each of the key anomalies identified is selected for being more informative regarding a set of anomalies than other non-key anomalies in the set of anomalies. At block 808, at least one related anomaly is identified for each key anomaly by selecting at least one non-key anomaly having the highest correlation value in relation to each of the key anomalies. In aspects of the disclosed technology, identifying related anomalies may comprise identifying the non-key anomalies, and for each, identifying the key anomaly having the highest degree of correlation for that particular non-key anomaly. The non-key and key anomalies may then be associated with one another. While block 806 indicates that at least one related anomaly is identified, there may be aspects where there are no related anomalies. At block 810, a message is generated based on the at least one key anomaly and the related anomalies. The message is a succinct way of alerting the monitoring system user as to the change in data of the group of metrics of interest to that user.

Identifying which metrics are of interest to the user, and thus which anomalies the user may be interested in, can involve tracking one or more user actions. For example, the user's usage patterns of reports that indicate data changes to various metrics may be tracked. When a user receives reports, the user may open the report but not spend much time looking through it, open the report and spend a significant amount of time reviewing it, or not open it at all. Another way to determine a user's interest is the user's set up of manual alerts for the metrics. A user may have the option to manually set up alerts to receiving information on various metrics. Given that the user has taken the time to set up an alert is an indication of a user's interest. The user's actions taken on the manual alerts (e.g., whether the user opens them, how long the user has them open) is another indication of interest. Upvotes and downvotes discussed further herein are also explicit indicators of a monitoring system user's interest. Each metric may be scored using a relevance and confidence score. These scores could be based on the factors described above.

Figure 9:
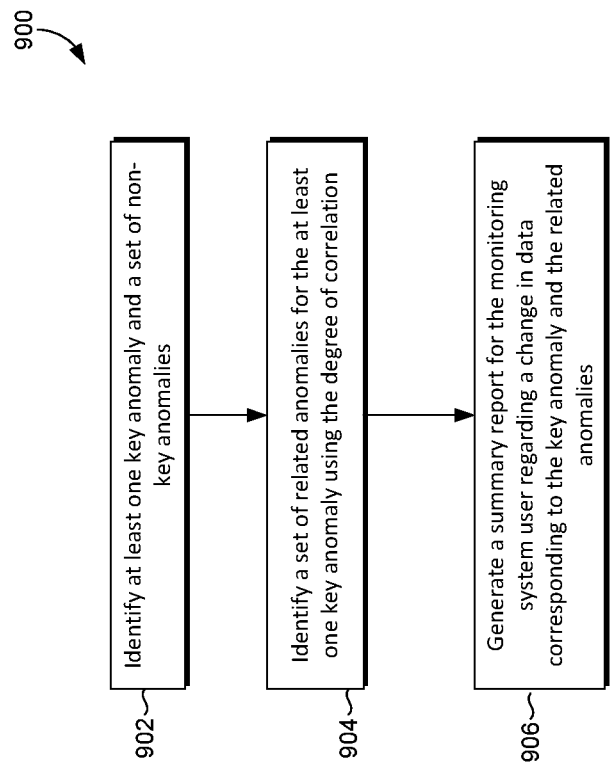
FIG. 9 is a flow diagram showing another method for summarizing a set of anomalies corresponding to a group of metrics of interest to a monitoring system user, in accordance with an embodiment of the disclosed technology.

FIG. 9 is a flow diagram showing another method 900 for summarizing a set of anomalies corresponding to a group of metrics of interest to a monitoring system user, in accordance with an embodiment herein. Initially at block 902, at least one key anomaly and a set of non-key anomalies are identified for a plurality of anomalies that correspond to metrics of interest to a monitoring system user. They may be identified, for instance, based on a degree of correlation between the key anomalies and the non-key anomalies. The identified key anomalies may be able to provide more information, and thus be more informative, regarding all of the anomalies than the non-key anomalies. As further described herein, there are different methods available for computing the degree of correlation, such as a correlation value. For example, the Pearson correlation coefficient may be used, or some other suitable correlation definition. The edge weights may also be assigned based on other factors, as long as the edge weight continues to convey how much information that anomaly on the metric corresponding to the source node conveys regarding the anomaly observed on metric corresponding to the target node in the graph. For example, the correlation value may indicate an ability of a first anomaly of a pair of anomalies to capture information content of a second anomaly of the pair of anomalies.

At block 904, a set of related anomalies for each key anomaly is identified using the degree of correlation between the key anomaly and non-key anomalies. At block 906, a summary report is generated for the monitoring system user regarding a change in data corresponding to the key anomaly and the corresponding set of related anomalies. In aspects, the anomalies may be represented as a graphical representation having correlation coefficients (e.g., edge weights) for each pair of anomalies. The correlation coefficients represent the degree of correlation between the key anomaly and other non-key anomalies. Multiple key anomalies may be identified in either a single iteration, or by way of multiple iterations.

Having described an overview of embodiments of the disclosed technology, an exemplary computing environment in which some embodiments of the disclosed technology may be implemented is described below in order to provide a general context for various aspects of the disclosed technology.

Figure 10:
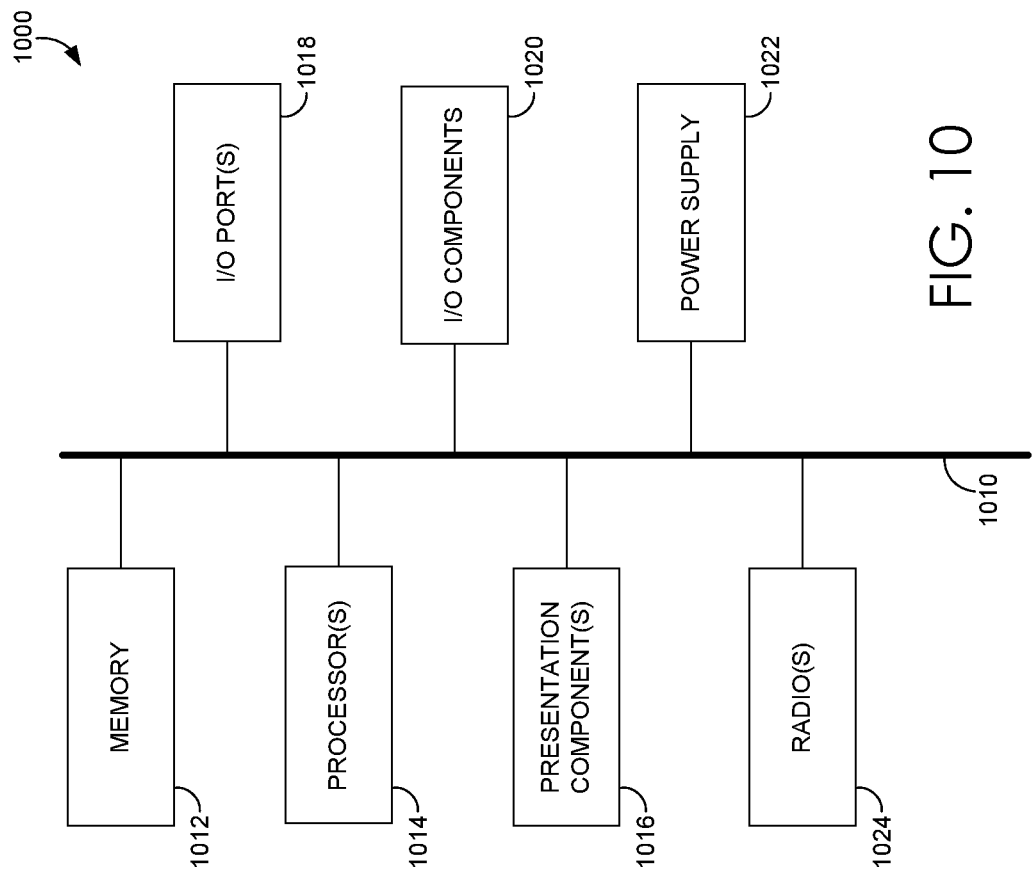
FIG. 10 is a block diagram of an exemplary computing environment in which embodiments of the technology may be employed.

Referring generally to FIG. 10, an exemplary operating environment for implementing embodiments of the disclosed technology is shown and designated generally as computing device 1000. Computing device 1000 is but one example of a suitable computing environment and is not intended to suggest any limitation as to the scope of use or functionality of the disclosed technology. Neither should the computing device 1000 be interpreted as having any dependency or requirement relating to any one or combination of components illustrated.

With reference to FIG. 10, computing device 1000 includes a bus 1010 that directly or indirectly couples the following devices: memory 1012, one or more processors 1014, one or more presentation components 1016, input/output (I/O) ports 1018, input/output components 1020, and an illustrative power supply 1022. Bus 1010 represents what may be one or more busses (such as an address bus, data bus, or combination thereof). Although the various blocks of FIG. 10 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors recognize that such is the nature of the art, and reiterates that the diagram of FIG. 10 is merely illustrative of an exemplary computing device that can be used in connection with one or more embodiments of the disclosed technology. Distinction is not made between such categories as "workstation," "server," "laptop," "hand-held device," etc., as all are contemplated within the scope of FIG. 10 and reference to "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, and removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 1000. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 1012 includes computer-storage media in the form of volatile and/or nonvolatile memory. The memory may be removable, non-removable, or a combination thereof. Exemplary hardware devices include solid-state memory, hard drives, optical-disc drives, etc. Computing device 1000 includes one or more processors that read data from various entities such as memory 1012 or I/O components 1020. Presentation component(s) 1016 present data indications to a user or other device. Exemplary presentation components include a display device, speaker, printing component, etc.

I/O ports 1018 allow computing device 1000 to be logically coupled to other devices including I/O components 1020, some of which may be built in. Illustrative components include a microphone, scanner, printer, wireless device, etc.

The disclosed technology has been described in relation to particular embodiments, which are intended in all respects to be illustrative rather than restrictive. Alternative embodiments will become apparent to those of ordinary skill in the art to which the disclosed technology pertains without departing from its scope.

What is claimed is:

1. A method for summarizing a set of anomalies corresponding to a group of metrics of interest to a monitoring system user, the method comprising:
   identifying a set of anomalies corresponding to the group of metrics as having anomaly values that are outside of a predetermined range;
   determining, for each anomaly in the set of anomalies:
      a severity factor indicating a magnitude of deviation between the anomaly value corresponding to an anomaly and the predetermined range;
      an interest value indicating the monitoring system user's interest in the group of metrics that is based on using a number of times the monitoring system user has interacted with a prior report associated with the group of metrics in a first period of time to determine a probability that the monitoring system user will request a report associated with the group of metrics in a next period of time; and
      a confidence factor representing a confidence in the interest value, for the group of metrics, based on a number of samples in a set of samples, wherein each sample of the set of samples comprises the interest value determined at a particular time within an interval of time;

determining, for each anomaly in the set of anomalies, an informativeness value that indicates how informative an anomaly in the set of anomalies is to the monitoring system user, the informativeness value based on the severity factor, the interest value, and the confidence factor corresponding with the anomaly in the set of anomalies;

assigning a correlation value for at least a portion of pairs of anomalies in the set of anomalies, the correlation value indicating an ability of a first anomaly of a pair of anomalies to capture information content of a second anomaly of the pair of anomalies;

utilizing the correlation value and the informativeness values to identify at least one key anomaly and a plurality of non-key anomalies from the set of anomalies; and generating, based on a user profile including prior report consumption patterns, manual alerts, and explicit feedback of the monitoring system user, a summary of the identified at least one key anomaly to provide information to the monitoring system user about the set of anomalies for a particular time period, wherein the at least one key anomaly is prioritized in the summary based on the user profile.

2. The method of claim 1, wherein determining the interest value is further based on a frequency at which the monitoring system user accesses the prior report associated with the group of metrics, and amount of time since a previous report was accessed by the monitoring system user, and a duration for which previous reports were generated for the group of metrics.

3. The method of claim 1, wherein the at least one key anomaly is an anomaly in the set of anomalies that is representative of the set of anomalies based on the informativeness values, and wherein the plurality of non-key anomalies are a plurality of anomalies in the set of anomalies that are less representative of the set of anomalies than the at least one key anomaly based on the informativeness values.

4. The method of claim 1, further comprising identifying a set of related anomalies for each of at least one key anomaly.

5. The method of claim 4, wherein identifying the set of related anomalies further comprises:
for each of the at least one non-key anomaly, identifying one of the at least one key anomaly based on the correlation value between the pair of anomalies; and
associating each of the at least one non-key anomaly with the one of the at least one key anomaly that has a higher correlation value.

6. The method of claim 1, wherein each anomaly in the set of anomalies represents a change in data for a corresponding metric.

7. The method of claim 4, wherein metrics corresponding to the at least one key anomaly and the metrics corresponding to the set of related anomalies are causally dependent on one another.

8. The method of claim 1, further comprising computing a first iteration of a gain value computation that is based on, at least, the compound correlation values and the informativeness values.

9. The method of claim 8, wherein the first iteration of the gain value computation identifies a first key anomaly of the at least one key anomaly.

10. The method of claim 8, further comprising computing a second iteration of the gain value computation wherein the at least one key anomaly comprises a second key anomaly from a second iteration of the gain value computation upon a determination that the second key anomaly meets a predetermined informativeness threshold that is less than the informativeness of the first key anomaly.

11. One or more computer storage media storing computer-usable instructions, that when used by a computing device, cause the computing device to perform a method for summarizing a set of anomalies corresponding to a group of metrics of interest to a monitoring system user, the method comprising:

determining, for each anomaly in the set of anomalies:
a severity factor indicating a magnitude of deviation between an anomaly value corresponding to an anomaly and a predetermined range;
an interest value indicating the monitoring system user's interest in the group of metrics that is based on a using a number of times the monitoring system user has interacted with a prior report associated with the group of metrics in a first period of time to determine a probability that the monitoring system user will request a report associated with the group of metrics in a next period of time; and
a confidence factor representing a confidence in the interest value, for the group of metrics, based on a number of samples in a set of samples, wherein each sample of the set of samples comprises the interest value determined at a particular time within an interval of time;

computing an informativeness value for each of the plurality of anomalies, the informativeness values calculated based on, at least, the severity factor, the interest value, and the confidence factor corresponding with the anomaly in the set of anomalies;

assigning a correlation value to at least one pair of anomalies for a plurality of anomalies, the correlation value indicative of how much information a first anomaly of the at least one pair of anomalies conveys in relation to a second anomaly of the at least one pair of anomalies;

from the plurality of anomalies, identifying at least one key anomaly using the correlation value of the at least one pair of anomalies and the informativeness values of each of the plurality of anomalies in the at least one pair of anomalies;

identifying at least one related anomaly for each of the at least one key anomaly by selecting at least one non-key anomaly having a highest correlation value with the each of the at least one key anomaly; and generating, based on a user profile including prior actions of the monitoring system user, a message based on the at least one key anomaly and the at least one related anomaly to provide a summary for the monitoring system user of changes in data for the plurality of anomalies.

12. The one or more computer storage media of claim 11, wherein identifying the at least one key anomaly further comprises:
computing a first iteration of a gain value for each anomaly in the plurality of anomalies using the computed correlation values and the informativeness values; and
for the first iteration of the gain value, identifying a first key anomaly of the plurality of anomalies having a highest gain value.

13. The one or more computer storage media of claim 11, further comprising detecting the plurality of anomalies, wherein the plurality of anomalies is detected within a single detection window of time.

14. The one or more computer storage media of claim 11, wherein identifying the at least one related anomaly further comprises:
- identifying at least one non-key anomaly as not having been identified as the at least one key anomaly;
- for each of the at least one non-key anomaly, identifying one of the at least one key anomaly that has a highest correlation value in relation to the each of the at least one non-key anomaly; and
- associating the each of the at least one non-key anomaly with the one of the at least one key anomaly that has the highest correlation value.

15. The one or more computer storage media of claim 11, further comprising identifying the set of anomalies by computing a metric score for each metric of the group of metrics of interest to the monitoring system user, the metric score comprising a relevance and confidence for each metric of the group of metrics, wherein the metric score is computed based on:
- the monitoring system user's usage patterns of a report indicating data changes of the group of metrics;
- the monitoring system user's set up of manual alerts for the group of metrics; and
- the monitoring system user's action taken on the manual alerts.

16. The one or more computer storage media of claim 11, wherein a metric is a specific type of monitored data.

* * * * *

UNITED STATES PATENT AND TRADEMARK OFFICE
CERTIFICATE OF CORRECTION

PATENT NO. : 12,112,349 B2  
APPLICATION NO. : 15/238208  
DATED : October 8, 2024  
INVENTOR(S) : Natwar Modani et al.

Page 1 of 1

It is certified that error appears in the above-identified patent and that said Letters Patent is hereby corrected as shown below:

In the Claims

Under Column no. 19, Claim 8, Line no. 60 delete "compound" and insert -- computed --

Signed and Sealed this
Seventeenth Day of December, 2024

Derrick Brent
*Acting Director of the United States Patent and Trademark Office*